(12) United States Patent
Aung (10) Patent No.: US 8,170,789 B2
(45) Date of Patent: May 1, 2012

(54) METHOD FOR PROVIDING SEARCH AREA COVERAGE INFORMATION (75) Inventor: Yan Lin Aung, Peoria, AZ (US)

(73) Assignee: Honeywell International Inc., Morristown, NJ (US)

(*) Notice: Subject to any disclaimer, the term of this patent is extended or adjusted under 35 U.S.C. 154(b) by 975 days.

(21) Appl. No.: 12/165,238

(22) Filed: Jun. 30, 2008

(65) Prior Publication Data

US 2009/0327273 A1    Dec. 31, 2009

(51) Int. Cl.
G01C 21/00    (2006.01)

(52) U.S. Cl. ........................................ 701/400

(58) Field of Classification Search .................. 701/200, 701/209, 207, 400; 342/158, 147–148; 340/518
See application file for complete search history.

(56) References Cited

U.S. PATENT DOCUMENTS

| 4,232,313 | A  | * | 11/1980 | Fleishman | ............... 342/36 |
| 6,021,374 | A  |   | 2/2000  | Wood      |                |
| 6,212,471 | B1 | * | 4/2001  | Stiles et al. | ........... 701/207 |
| 6,222,464 | B1 |   | 4/2001  | Tinkel et al. |            |
| 2007/0219677 | A1 | | 9/2007 | Winker et al. |            |

* cited by examiner

*Primary Examiner* — Yonel Beaulieu
(74) *Attorney, Agent, or Firm* — Ingrassia Fisher & Lorenz, P.C.

(57)    ABSTRACT

A method for displaying search area coverage is provided. A searched area (414) is recorded by a moving entity (202, 302), the search area (420) having a width defined by the position of the search entity (202, 302) as it progresses through a search area (420). The search area (420) and the searched area (414) are then displayed on a display (116), thereby illustrating the search area remaining to be searched. Optionally, the width of the searched area (414) may be adjusted in accordance the altitude, speed, or visibility of the search entity (202, 302), and a pattern may be suggested for the search entity (202, 302) to ensure coverage of the search area (420).

19 Claims, 6 Drawing Sheets

METHOD FOR PROVIDING SEARCH AREA COVERAGE INFORMATION

FIELD OF THE INVENTION

The present invention generally relates to search patterns and more particularly to a method for tracking, recording, and displaying an area searched by a moving search vehicle such as an aircraft.

BACKGROUND OF THE INVENTION

Many occasions arise necessitating a search. An airplane or boat may be missing and feared down or disabled. People on the ground such as hikers may not have returned at an expected time. Responsible authorities may institute a search in these situations. A search may be conducted in the air, over water, on land, or a combination thereof.

In order to avoid missing a portion of a search area, the searching entity, for example, an airborne, sea going, or land based vehicle, will follow a pattern in an attempt to cover all of the search area. Also, the search may be performed by several search vehicles in a coordinated effort using visual or radio contact. However, many factors may prevent an effective coverage of the entire search area. For example, the search vehicle may not precisely follow the pattern and may not perform the search at an optimal speed. In the case of an airborne search, the altitude may not be effective for either a given search vehicle providing a limited visual platform or size of the entity for which the search is being conducted. The efficiency of the search may be degraded by more than one search vehicle searching the same area.

Accordingly, it is desirable to provide an apparatus and method for conducting a search that provides an effective and efficient search. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method for displaying search area coverage includes recording a searched area by a moving entity, the searched area having a width defined by the position of the search entity as it progresses through a search area. The search area and the searched area are then displayed on a display, thereby illustrating the search area remaining to be searched. Optionally, the width of the searched area may be adjusted in accordance the altitude, speed, or visibility of the search entity, and a pattern may be suggested for the search entity to ensure coverage of the search area.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A method is provided for recording and displaying an area searched and, therefore illustrating the area yet to be searched within a defined search area. The displayed area searched may be adjusted according to a searching entity's altitude, speed, and visibility. The searching entity may be a person utilizing vision or electronics utilizing, for example, optical capabilities.

The search may be conducted in the air, over water, on land, or a combination thereof, and may be performed on various types of search vehicles, such as an airplane, helicopter, boat, land based vehicle, or on foot. The mapping methods described herein may be applied to a variety of applications, such as automobile, marine, and aviation; however, an aviation environment is described herein as the exemplary embodiment and includes navigation over a search area. Various types of maps may be used, for example, road maps, terrain maps, and topographical maps.

Some applications may require more than one display, for example, a head down display screen, to accomplish the mission. These monitors may include a two dimensional moving map display and a three dimensional perspective display. A moving map display may include a top-down view of the aircraft, the search pattern, and the surrounding environment. Various symbols may be used to denote navigational cues (e.g., waypoint symbols, line segments interconnecting the waypoint symbols, range rings) and nearby environmental features (e.g., terrain, weather conditions, political boundaries, etc).

The moving map display and the perspective display each provide a pilot (or other observer) with important navigational information. For example, the moving map display permits a pilot to easily determine the aircraft's location with reference to geographical landmarks, including significant geographical features (e.g., ridges, mountain ranges, valleys, etc.) and man-made structures (e.g., airports). Consequently, a pilot may refer to the moving map display when guiding an aircraft in the search pattern. The perspective display, by comparison, provides information regarding the aircraft's orientation (e.g., the aircraft's attitude, altitude, pitch, roll, etc.) and aspects of nearby geographical features in an intuitive manner. Thus, a pilot may refer to the perspective display when navigating around a geographical feature, such as a mountain.

Embodiments of the present invention may utilize whatever navigation system signals are available, for example a ground based navigational system, a GPS navigation aid, a flight management system, and an inertial navigation system, to dynamically calibrate and determine a precise search pattern.

Figure 1:
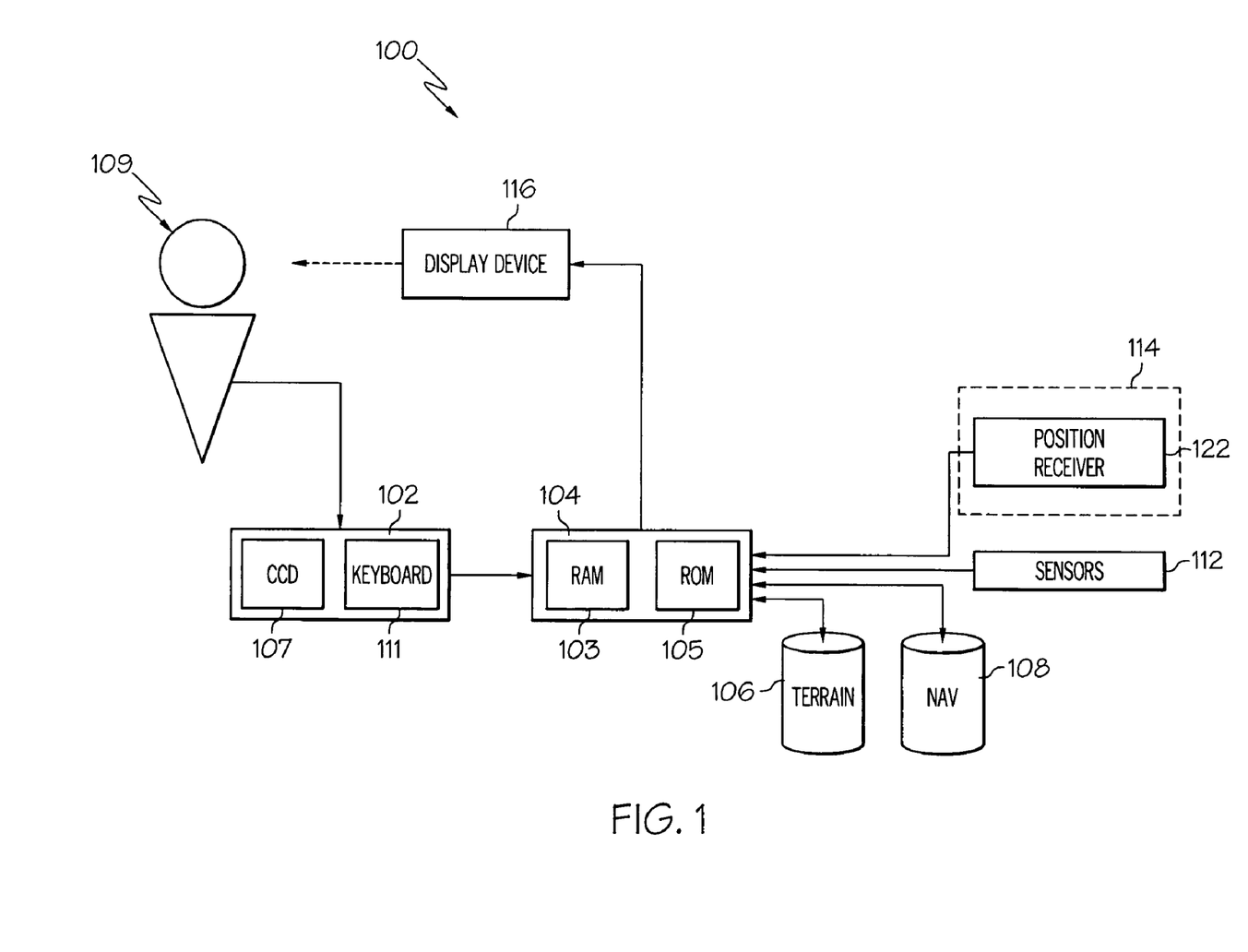
FIG. 1 is a functional block diagram of a flight display system in accordance with an exemplary embodiment.

Referring to FIG. 1, an exemplary flight deck display system is depicted and will be described. The system 100 includes a user interface 102, a processor 104, one or more terrain databases 106, one or more navigation databases 108, various sensors 112, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various search pattern related data such as, for example, waypoints, waypoint latitude and longitude, data related to different navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only a global position system (GPS) receiver 122 is depicted in FIG. 1.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

The display device 116 is used to display various images and data, in both a graphical and a textual format, and to supply visual feedback to the user 109 in response to the user input commands supplied by the user 109 to the user interface 102. It will be appreciated that the display device 116 may be implemented using any one of numerous known display devices suitable for rendering image and/or text data in a format viewable by the user 109. Non-limiting examples of such display devices include various cathode ray tube (CRT) displays, and various flat panel displays such as, various types of LCD (liquid crystal display) and TFT (thin film transistor) displays. The display device 116 may additionally be implemented as a panel mounted display, a HUD (head-up display) projection, or any one of numerous known technologies.

Figure 2:
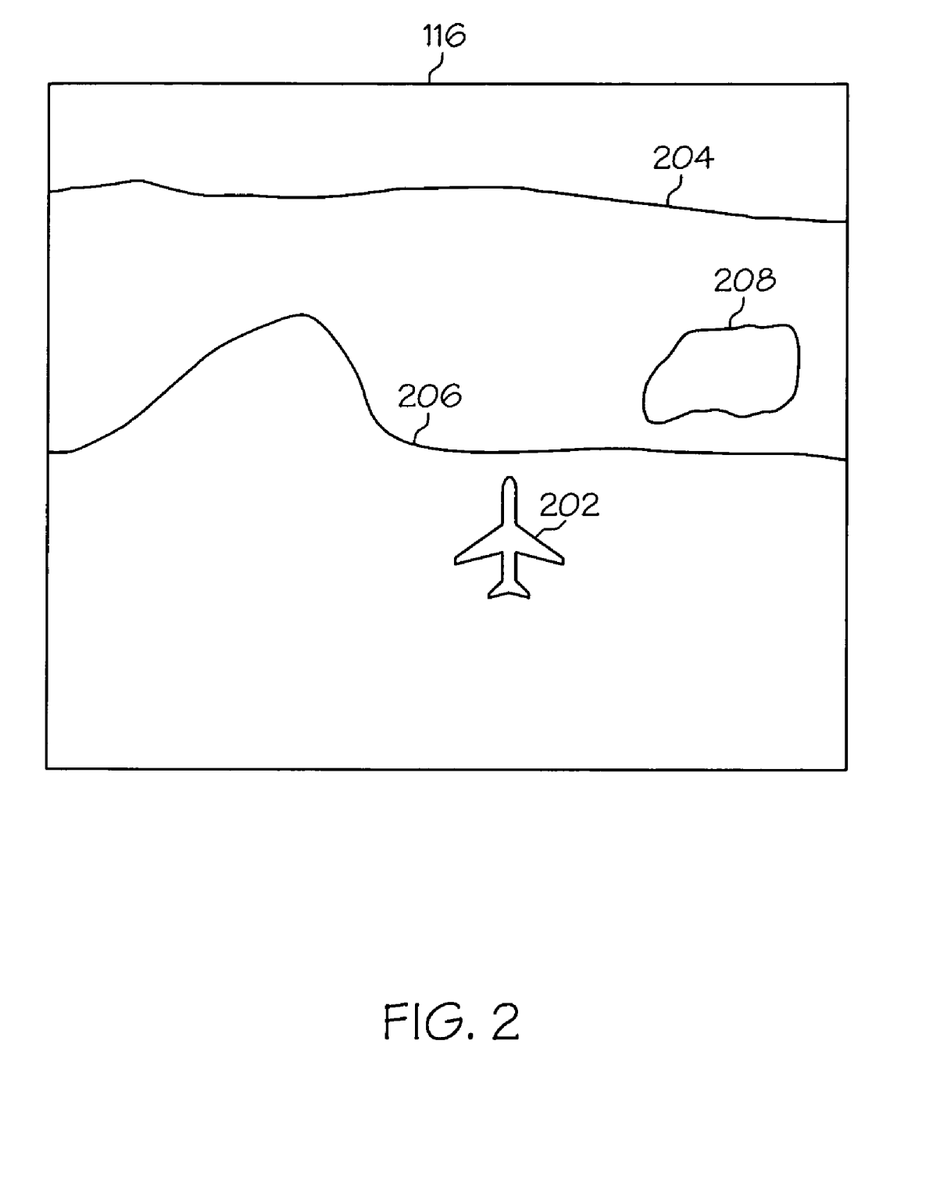
FIG. 2 is an exemplary image of a terrain map that may be rendered on the flight display system of FIG. 1.
Figure 3:
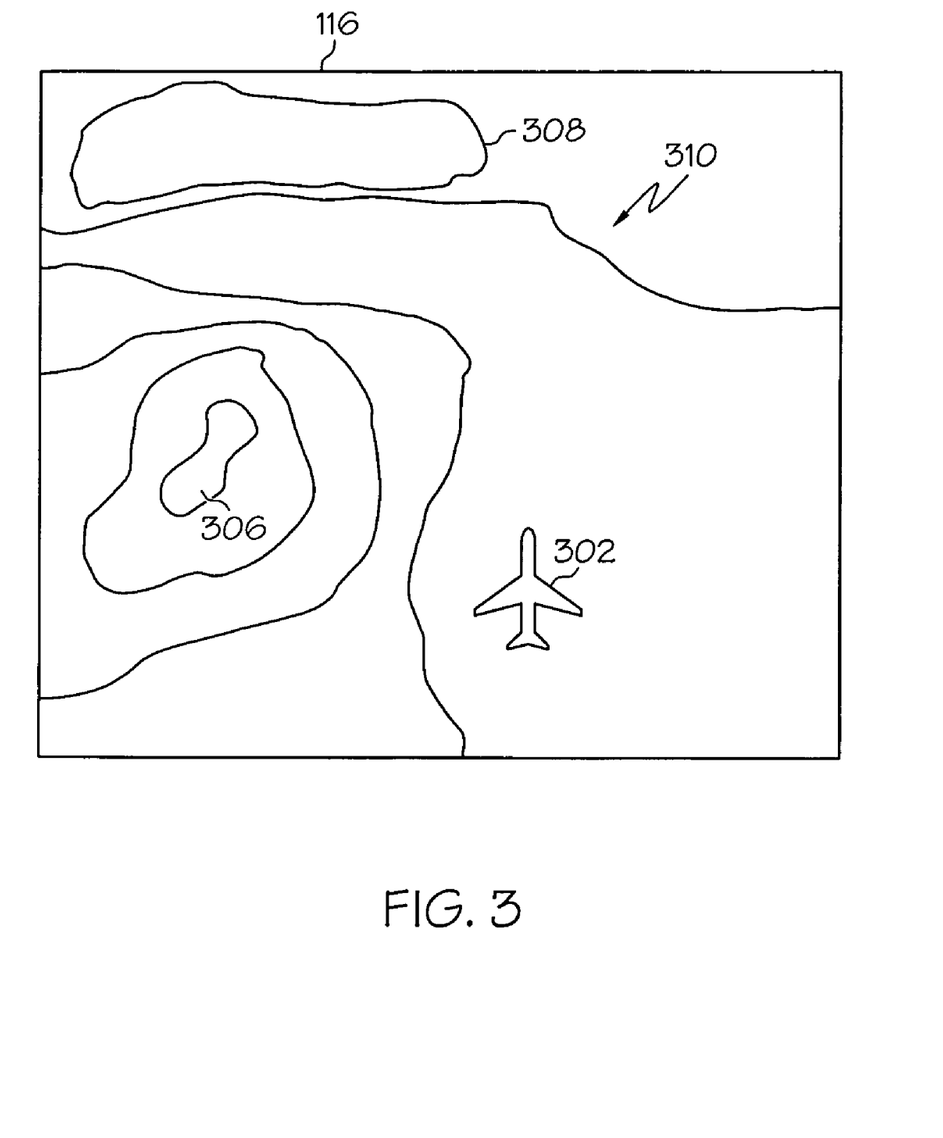
FIG. 3 is an exemplary image of a topographical map that may be rendered on the flight display system of FIG. 1.

FIGS. 2 and 3 include examples of the types of maps that may be displayed on the display device 116, wherein the pilot may switch from one map to another depending on the flight situation. FIGS. 2 and 3 illustrate examples of a terrain map and a topographical map, respectively. The terrain map of FIG. 2 includes an aircraft icon 202, the horizon 204, a hill 206, and a lake 208. A view of a different terrain map could include other features such as a river, a mountain, and the like.

The topographical map of FIG. 3 displays features including an aircraft icon 302, a lake 308, and various altitude gradients 310 of the hill 306. In addition to the terrain map and topographical map, other types of maps, such as an aviation map, could be used.

Figure 4:
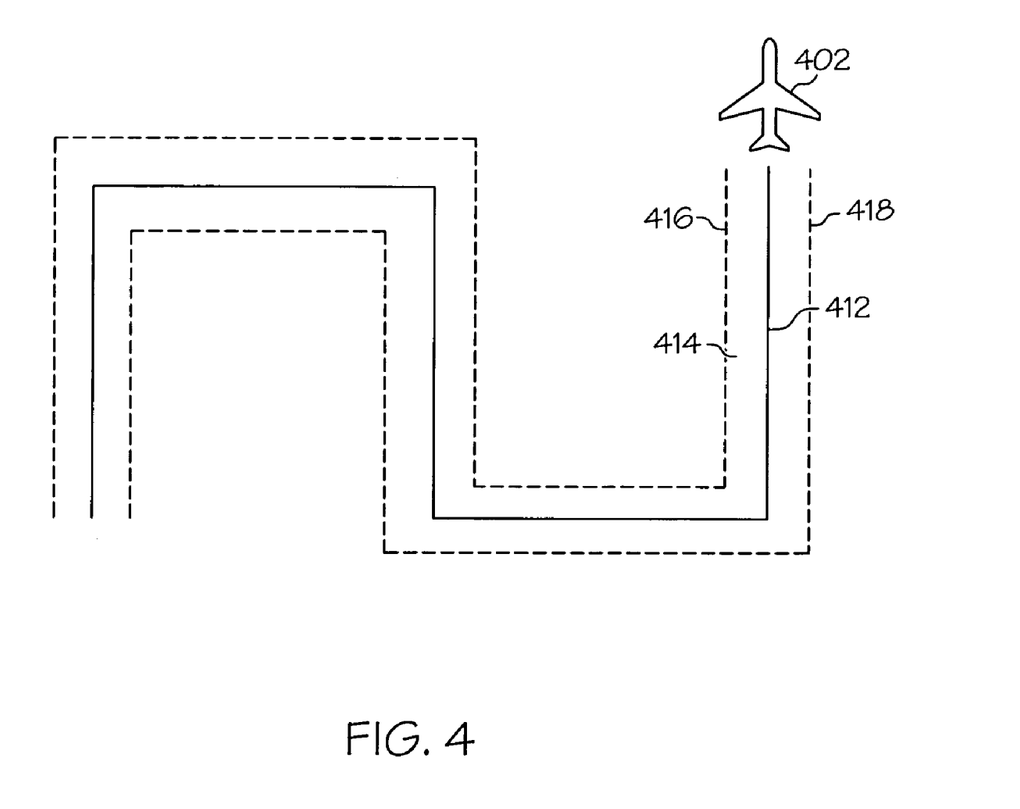
FIG. 4 is an image of an area searched displayed in accordance with An exemplary embodiment.

Referring to FIG. 4, the line 412 is the path of the aircraft search vehicle 402 as it has moved in relation to the surface, for example, ground or water, therebeneath. The area 414 encompassed by lines 416, 418 is the area visible, or searched, by the search entity aboard the aircraft 402 as it transitions across the search area 420, wherein the searching or viewing may be accomplished visually by the pilot (and or others on the aircraft) in accordance with human perception abilities, electronically by a computer and sensor system in accordance with electronic perception abilities, or a combination thereof. The aircraft 402 may be flown so the searched area 414 overlaps on each pass, and more than one aircraft 402 may be utilized to shorten the search time.

Figure 5:
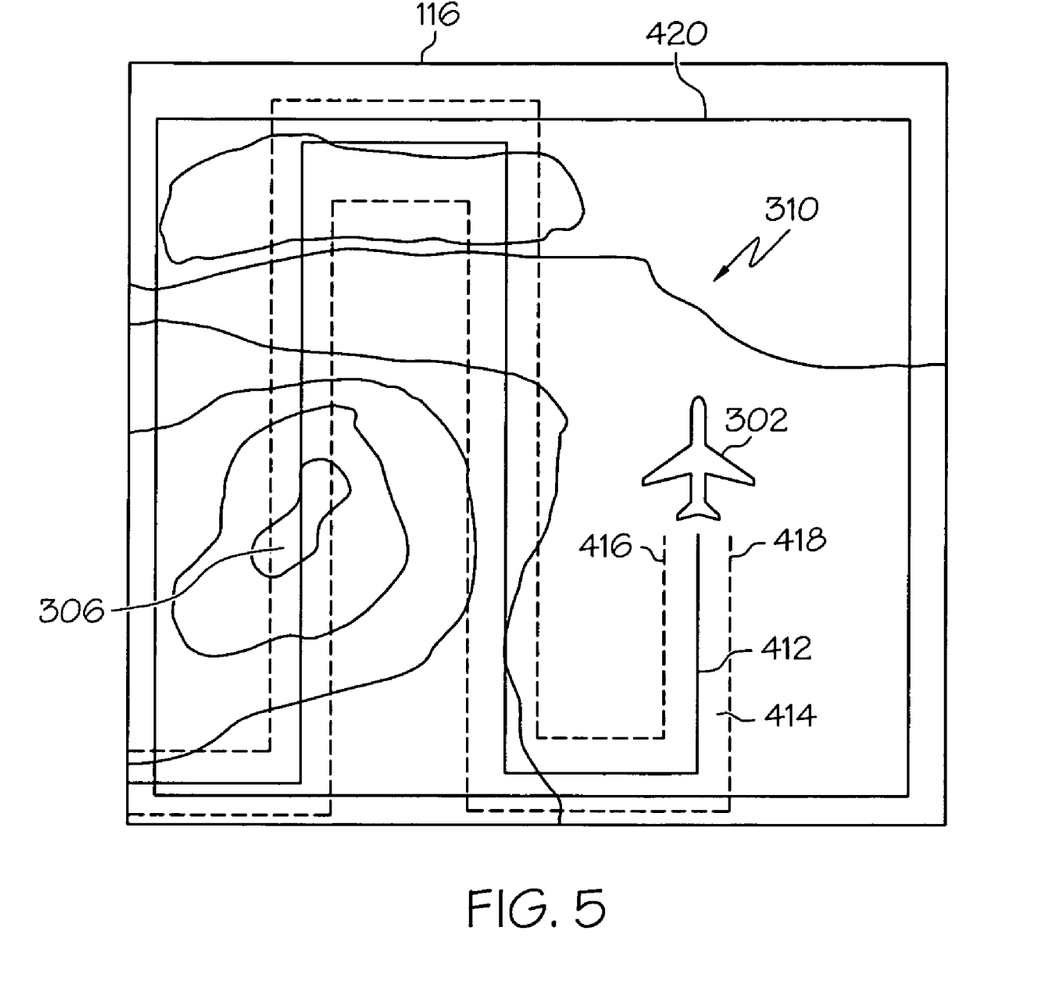
FIG. 5 is an image of an area searched displayed over the topographical map of FIG. 3 in accordance with an exemplary embodiment.

In accordance with the preferred embodiment, the system 100 records the flight path 412 and the searched area 414 in the RAM 103 as the aircraft 402 transverses the search area 420 using the external data source 114 to accurately determine the coordinates of the searched area 414. This searched area 414 is displayed on a map, for example the topographical map of FIG. 3, as shown in FIG. 5. The pilot may then see on the display 116 the searched area 414 covered as well as the area not covered within the search area 420. The pilot, or the processor 104 may determine, a flight pattern to ensure coverage of the entire search area 420.

The size of the searched area 414 is impacted by several factors, including altitude, visibility, and speed. As the altitude of the aircraft 402 increases above a preferred altitude, the more difficult it is to make out features on the surface of the search area because of the increased distance between the search entity and the target; therefore, as the altitude of the aircraft 402 increases above the preferred altitude, the lines 416, 418 would be closer to the flight path 412 and the searched area 414 would be smaller. Likewise, as the altitude of the aircraft 402 decreases below the preferred altitude, the more difficult it is to make out features away from the flight path 412 due to loss of perspective; therefore, as the altitude of the aircraft 402 decreases below the preferred altitude, the lines 416, 418 would be closer to the flight path 412 and the searched area 414 would be smaller.

The ability to find the target in the search area 414 may also depend on the visibility within the area 414, which may be degraded by the position of the sun, haze, smog and the like. The lower the visibility, the lower the width of the search area 414, Additionally, the ability to see out of the aircraft would impact the size of the area 414. The pilot may be able to see well only out of one side of the aircraft, or the windows may be small, thereby reducing the width of the search area 414.

Furthermore, the speed of the aircraft impacts the ability to search. Generally, the faster the aircraft, the less time the pilot has to look at the area 414, thereby decreasing the width of the search area 414.

Each of these factors (altitude, visibility, and speed) may be provided to the processor 104 which adjusts the disposition of the lines 416, 418 which define the width of the search area 414 as displayed on the display 116.

Figure 6:
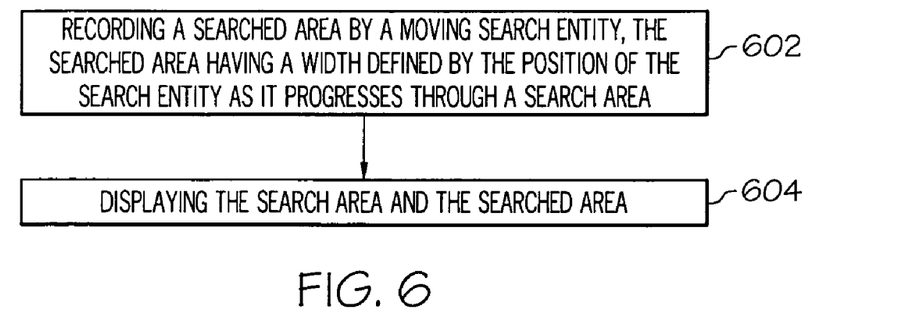
FIG. 6 is a flow chart of the method in accordance with a first exemplary embodiment.
Figure 7:
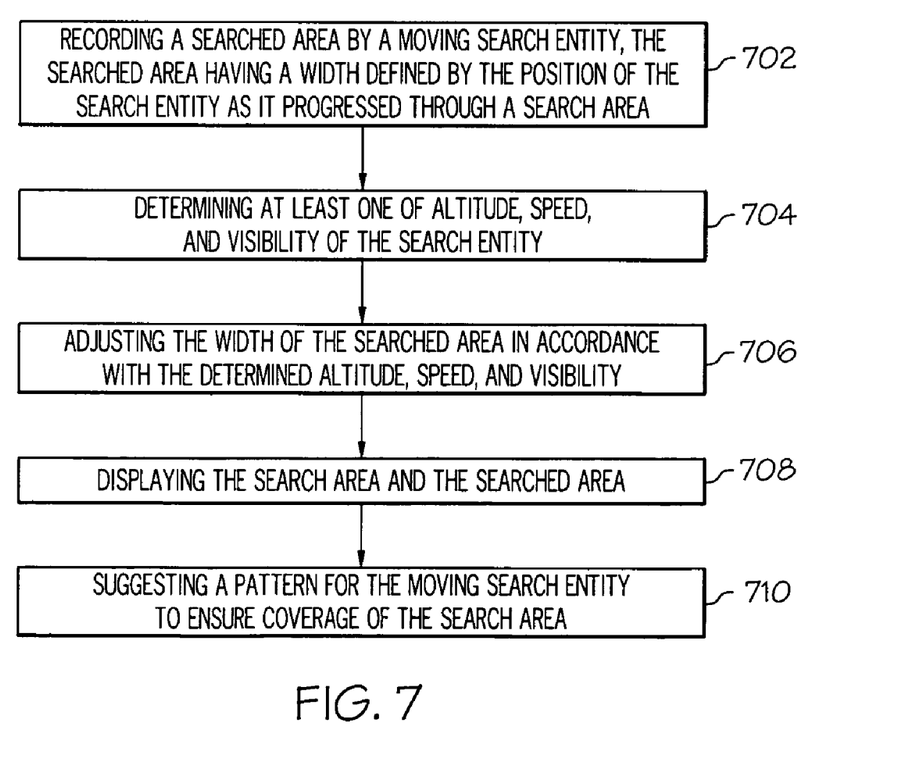
FIG. 7 is a flow chart of the method in accordance with a second exemplary embodiment.

The method according to a first exemplary embodiment is shown in FIG. 6 wherein a searched area (414) is recorded 602 by a moving search entity, the searched area (414) having a width defined by the position of the search entity as it progresses through a search area (420). The search area (420) and the searched area (414) are then displayed 604. FIG. 7 is a second exemplary embodiment wherein a searched area (414) is recorded 702 by a moving search entity, the searched area (414) having a width defined by the position of the search entity as it progresses through a search area (420). A determination is made 704 of at least one of altitude, speed, and visibility of the search entity. The width of the searched area (414) is adjusted 706 in accordance with the determined altitude, speed, and visibility and displayed 708. Optionally, a suggested pattern is provided 710 for the moving search entity to ensure coverage of the search area (420).

The processor 104 compares the width of the searched area 414 and the search area 420 remaining and suggests a pattern for the search entity to assume to efficiently cover the remaining unsearched area.

A method and apparatus has been described for illustrating the area yet to be searched within a defined search area, thereby providing an effective method of ensuring a complete search. Furthermore, the displayed area searched may be adjusted according to the searching entity's altitude, speed, and visibility.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for displaying search area coverage, comprising:
    recording a searched area by a moving entity as it progresses through a search area, the searched area comprising a portion of the search area and determined at least by the ability to see out of the moving entity;
    displaying the searched area and the search area;
    identifying an unsearched area; and
    suggesting a search pattern for searching the unsearched area.

2. The method of claim 1 wherein the recording step comprises adjusting the size of the searched area in accordance with the speed of the moving entity.

3. The method of claim 1 wherein the recording step comprises adjusting the size of the searched area in accordance with the altitude of the moving entity.

4. The method of claim 1 wherein the searched area is determined by number of windows on the moving entity.

5. The method of claim 1 wherein the searched area is determined by the size of a window in the moving entity.

6. The method of claim 1 wherein the recording step comprises defining the searched area in accordance with human perception abilities.

7. The method of claim 1 wherein the recoding step comprises defining the searched area in accordance with electronic perception abilities.

8. A method for displaying a searched area coverage, comprising:
    recording a searched area by a moving entity, the searched area having a width defined by the position of the moving entity as it progresses through a search area and the ability to see out of the moving entity;
    displaying the search area and the searched area;
    identifying an unsearched area; and suggesting a search pattern for searching the unsearched area.

9. The method of claim 8 wherein the recording step comprises adjusting the width of the searched area in accordance with speed of the moving entity.

10. The method of claim 8 wherein the recording step comprises adjusting the width of the searched area in accordance with the altitude of the moving entity.

11. The method of claim 8 wherein the searched area is determined by number of windows on the moving entity.

12. The method of claim 8 wherein the searched area is determined by the size of a window.

13. The method of claim 8 wherein the recording step comprises defining the searched area in accordance with human perception abilities.

14. The method of claim 8 wherein the recoding step comprises defining the searched area in accordance with electronic perception abilities.

15. A method for displaying a searched area coverage, comprising:

recording a searched area by a moving entity, the searched area having a width defined by the position of the moving entity as it progresses through the searched area and determined by the ability to see out of the moving entity;

determining a speed of the moving entity;

adjusting the width of the searched area in accordance with the determined speed and ability to see out of the moving entity;

displaying and the searched area; and suggesting a pattern for moving the moving entity to ensure coverage of the searched area.

16. The method of claim 15 wherein the searched area is determined by number of windows on the moving entity.

17. The method of claim 15 wherein the moving entity is disposed on a sea craft.

18. The method of claim 15 wherein the moving entity comprises a person.

19. The method of claim 15 wherein the moving entity comprises electronics.

* * * * *